(12) United States Patent
Ohkawa

(10) Patent No.: US 7,480,075 B2
(45) Date of Patent: Jan. 20, 2009

(54) IMAGE PROCESSING APPARATUS, IMAGE PROCESSING METHOD, AND IMAGE PROCESSING PROGRAM

(75) Inventor: Mieko Ohkawa, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 860 days.

(21) Appl. No.: 10/874,031

(22) Filed: Jun. 21, 2004

(65) Prior Publication Data

US 2005/0012947 A1 Jan. 20, 2005

(30) Foreign Application Priority Data

Jul. 15, 2003 (JP) ............... 2003-197116
Jul. 23, 2003 (JP) ............... 2003-200386
Apr. 28, 2004 (JP) ............... 2004-133753

(51) Int. Cl.
*H04N 1/407* (2006.01)
*H04N 1/409* (2006.01)
*H04N 1/56* (2006.01)
*G06T 5/00* (2006.01)

(52) U.S. Cl. .................. 358/1.9; 358/3.27; 358/519; 358/521

(58) Field of Classification Search .................. 358/1.9, 358/3.26, 3.27, 519, 521, 522
See application file for complete search history.

(56) References Cited

U.S. PATENT DOCUMENTS 6,987,886 B1 * 1/2006 Okubo et al. ............... 382/194

FOREIGN PATENT DOCUMENTS

| JP | 04-037259 A | 2/1992 |
|---|---|---|
| JP | 06-062252 A | 3/1994 |
| JP | 07-095406 A | 4/1995 |
| JP | 8-23449 A | 1/1996 |
| JP | 08-032807 A | 2/1996 |
| JP | 8-181863 A | 7/1996 |
| JP | 8-214164 A | 8/1996 |
| JP | 8-289143 A | 11/1996 |
| JP | 2002-314814 A | 10/2002 |
| JP | 2003-087568 A | 3/2003 |
| JP | 2003-338930 A | 11/2003 |

OTHER PUBLICATIONS

Japanese Office Action (and English translation thereof) dated Feb. 26, 2008, issued in a counterpart Japanese Application.
Japanese Office Action (and English translation thereof) dated Jul. 22, 2008, issued in a counterpart Japanese Application.

* cited by examiner

*Primary Examiner*—Thomas D Lee
(74) *Attorney, Agent, or Firm*—Frishauf, Holtz, Goodman & Chick, P.C.

(57) ABSTRACT

An image processing apparatus capable of duplex recording on two faces of recording paper on a basis of input image data, includes: a background adjustment section for performing a background adjustment on a basis of a plurality of background adjustment γ curves; a setting section for setting one background adjustment γ curve from the plurality of background adjustment γ curves; an image processing section for processing the input image data with the background adjustment γ curve set by the setting section; and an image output section for performing duplex recording control to the two faces of the recording paper on a basis of output image data to which the background adjustment is performed by the image processing section.

10 Claims, 10 Drawing Sheets

IMAGE PROCESSING APPARATUS, IMAGE PROCESSING METHOD, AND IMAGE PROCESSING PROGRAM

BACKGROUND OF THE INVENTION

1. Field of the Invention

The present invention relates to an image processing apparatus, an image processing method, and an image processing program. In particular, the present invention relates to an image processing apparatus, an image processing method, and an image processing program, which is capable of various gradation adjustments to an input image and background adjustment of the image.

2. Description of Related Art

Various image processing apparatuses such as copying machine capable of a gradation adjustment based on various γ curves corresponding to various adjustment contents such as a density adjustment, a contrast adjustment, a background adjustment, a red color adjustment, a blue color adjustment, and a green color adjustment (including adjustment level) have been developed so far. In particular, recently, image processing apparatuses capable of a gradation adjustment based on a plurality of γ curves corresponding to not only the above adjustment contents but also contents of various combined adjustments (hereinafter, referred to as combined adjustment) composed by combining a plurality of adjustment contents have been devised as described in JP-Tokukaihei-7-95406A and JP-Tokukaihei-8-32807A.

This γ curve is represented by a gradation adjustment function representing correlation between gradation of an input image (hereinafter referred to as input gradation) and gradation of an output image after the gradation adjustment (hereinafter referred to as output gradation). This gradation adjustment function (hereinafter referred to as a γ curve) corresponds to table data (referred to as gradation adjustment data) for indicating the output gradation for every input gradation. Hereinafter, each of a γ curve, a gradation function and gradation adjustment data denotes the same meaning.

That is, the above image processing apparatus stores the above gradation adjustment data in a memory which is previously provided in a storage section. During the gradation adjustment, the above image processing apparatus performs the gradation adjustment on the basis of the gradation adjustment data.

However, the above conventional techniques have the following problems.

That is, a large amount of gradation data corresponding to not only the gradation adjustment corresponding to the density adjustment, the contrast adjustment, the background adjustment, the red color adjustment, the blue color adjustment, and the green color adjustment (including adjustment level), but also various combined adjustments composed by combining the plurality of these adjustments, must be stored previously in a storage section of the above conventional image processing apparatus in order to perform the gradation adjustment. Consequently, a great amount of memory capacity is required.

On the other hand, it can be considered to limit combination contents (combination patterns deciding adjustments to be combined) in order to make the memory capacity smaller. However, in such case, it is hard to realize a huge variety of combination patterns.

Further, historically, an image processing apparatus such as a copying machine calculates approximate lightness representing lights/darks of an image on the basis of luminance of input image data obtained from the input image, adjusts the approximate lightness of the input image data on the basis of a previously set background adjustment γ curve, and makes output image data on the basis of the approximate lightness after the adjustment.

Hereupon, the luminance is represented by an integer from 0 to 255 standardized in 8 bits data. Further, the highs/lows of the approximate lightness corresponds to the lights/darks of the image.

$$b = \sqrt{\frac{a}{255}} \times 255 \qquad \text{[Formula 1]}$$

(*a*: luminance, *b*: approximate lightness)

Hereupon, the calculated lightness b is an integer equal to or more than 0 and equal to or less than 255 rounded off after the decimal point thereof.

The density of an image is calculated by the following formula on the basis of the luminance. Hereupon, the density is defined as "c".

$$C = -\text{Log}_{10}\left(\frac{10^{-0.03}}{255}a\right) \qquad \text{[Formula 2]}$$

Hereinafter, explanations will be provided by using the approximate lightness. However, it is possible to convert the approximate lightness into the luminance or the density and use them as needed by using the above formulas 1 and 2. For example, the approximate lightness of 150, 200, 225 and 255 are converted into the density of 0.492, 0.241, 0.140 and 0.030, respectively (each of the density is calculated to three places of decimals).

The above adjustment of the approximate lightness will be described with reference to FIG. 10. In this case, the abscissa axis represents the approximate lightness of the input image data and the longitudinal axis represents the approximate lightness of the output image data.

In a background adjustment γ curve X1 shown in FIG. 10, when the background lightening is performed by setting the approximate lightness of the output image data to be higher with respect to a background part (lighter area of which approximate lightness is equal to or more than 150, shown by a note B1 in FIG. 10) of which the approximate lightness is relatively low, the gradient of the background adjustment γ curve is set to be more than 1 with respect to whole area (0 to 255) of the approximate lightness of the input image data, and the approximate lightness of the output image data is set to be higher totally.

Further, in a background adjustment γ curve X2 shown in FIG. 10, when the approximate lightness of the output image data is set to be lower and the background is enhanced (hereinafter referred to as highlight enhancing) with respect to the background, the gradient of background adjustment γ curve is set to be less than 1 with respect to whole area of the approximate lightness of the input image data, and the approximate lightness of the output image data is set to be lower totally.

Hereinafter, the adjustment of the approximate lightness with respect to the background as described above may be referred to as the background adjustment.

Hereupon, the background adjustment γ curve represents the correlation between the approximate lightness of the input image data and the approximate lightness of the output image data. For example, when the approximate lightness of the input image data and the approximate lightness of the output image data are the same each other, the background adjustment γ curve representing the correlation between both approximate lightness is represented as a straight line of which gradient is 1.

When the background lightening is performed in the above way, a show-through part, which is the part of a backside image seen through a foreside of an original, is enhanced despite the intention. Further, when the highlight enhancing is performed in the above way, the background is enhanced and accordingly background fogging occurs. On the other hand, the technique capable of removing the show-through part while performing the background lightening has been developed recently as shown in JP-Tokukai-2002-314814A. However, because the technique described in JP-Tokukai-2002-314814A needs the processing using the filter for removing the show-through part in addition to the processing using the above-described background adjustment γ curve, the processing flow becomes complicated. Furthermore, because the show-through part is removed with the same filter regardless of the degree of lights/darks of the show-through part, the difference of subtle lights/darks of the background is uniformly smoothed, and accordingly the reproducibility of the output image is decreased. Furthermore, it is still difficult to solve the problem that the background is enhanced and accordingly background fogging occurs when the highlight enhancing is performed in the above way, as described above.

SUMMARY OF THE INVENTION

An object of the present invention is to provide an image processing apparatus, an image processing method and an image processing program, which can perform an image processing adjustment without requiring a great amount of memory capacity. Also, an object is to provide an image processing apparatus capable of performing a background adjustment sensitively with respect to the background part of which image lightness is relatively lighter, without complicating a processing flow.

The above objects of the present invention are accomplished by the following configurations.

To solve the above problems, in according to a first aspect of the present invention, an image processing apparatus capable of duplex recording on two faces of recording paper on a basis of input image data, comprises:

a background adjustment section for performing a background adjustment on a basis of a plurality of background adjustment γ curves;

a setting section for setting one background adjustment γ curve from the plurality of background adjustment γ curves;

an image processing section for processing the input image data with the background adjustment γ curve set by the setting section; and an image output section for performing duplex recording control to the two faces of the recording paper on a basis of output image data to which the background adjustment is performed by the image processing section.

According to the first aspect of the present invention, the image processing apparatus can perform the background adjustment of an image sensitively by using the background adjustment γ curve. Furthermore, the show-through part of an image can be removed by using the background adjustment γ curve without using any filters for removing the show-through part. In addition, because the background adjustment can be performed in detail, the case where the approximate lightness of a background part is uniformly smoothed can be avoided.

Preferably, the number of kinds of the plurality of background adjustment γ curves is at least two.

According to the present invention, by using at least two kinds of the plurality of background adjustment γ curves, the background adjustment in background lightening and highlight enhancing can be performed sensitively.

Preferably, one of the two kinds of background adjustment γ curves increases monotonically from a low density value to a high density value in a range where a density value of the input image data is equal to or less than 0.63 in order that a gradient of the background adjustment γ curve changes from being equal to or less than 1 to being more than 1.

According to the present invention, by using one of the two kinds of the plurality of background adjustment γ curves, highlight reproduction can be smoothed, show-through caused by a light background can be removed, and a background adjustment can be performed sensitively.

Preferably, one of the two kinds of background adjustment γ curves increases monotonically from a low density value to a high density value in a range where a density value of the input image data is equal to or more than 0.24 and equal to or less than 0.63 in order that a gradient of the background adjustment γ curve changes from being equal to or less than 1 to being more than 1.

According to the present invention, by using one of the two kinds of the plurality of background adjustment γ curves, background fogging can be smoothed, highlight reproduction can be removed, and a background adjustment can be performed sensitively.

According to a second aspect of the present invention, an image processing apparatus capable of duplex recording on two faces of recording paper on a basis of input image data, comprises:

a background adjustment section for performing a background adjustment on a basis of a plurality of background adjustment γ curves;

a setting section for selecting and setting one background adjustment γ curve, which is suitable for output image data corresponding to a highlight peak at a highlight point above a predetermined value of the input image data, from the plurality of background adjustment γ curves;

an image processing section for processing the input image data with the background adjustment γ curve set by the setting section; and an image output section for performing duplex recording control to the two faces of the recording paper on a basis of output image data to which the background adjustment is performed by the image processing section.

According to the second aspect of the invention, the setting section can perform the background adjustment of an image sensitively by using one background adjustment γ curve, which is suitable for output image data corresponding to a highlight peak at a highlight point above a predetermined value of the input image data, from the plurality of background adjustment γ curves. Furthermore, the show-through part of an image can be removed by using the background adjustment γ curve without using any filters for removing the show-through part. In addition, because the background adjustment can be performed in detail, the case where the approximate lightness of a background part is uniformly smoothed can be avoided.

Preferably, the number of kinds of the plurality of background adjustment γ curves is at least two.

According to the present invention, by using at least two kinds of the plurality of background adjustment γ curves, the background adjustment in background lightening and highlight enhancing can be performed sensitively.

Preferably, one of the two kinds of background adjustment γ curves increases monotonically from a low density value to a high density value in a range where a density value of the input image data is equal to or less than 0.63 in order that a gradient of the background adjustment γ curve changes from being equal to or less than 1 to being more than 1.

According to the present invention, by using one of the two kinds of the plurality of background adjustment γ curves, highlight reproduction can be smoothed, show-through caused by a light background can be removed, and a background adjustment can be performed sensitively.

Preferably, one of the two kinds of background adjustment γ curves increases monotonically from a low density value to a high density value in a range where a density value of the input image data is equal to or more than 0.24 and equal to or less than 0.63 in order that a gradient of the background adjustment γ curve changes from being equal to or less than 1 to being more than 1.

According to the present invention, by using one of the two kinds of the plurality of background adjustment γ curves, background fogging can be smoothed, highlight reproduction can be removed, and a background adjustment can be performed sensitively.

According to a third aspect of the present invention, an image processing method capable of duplex recording on two faces of recording paper on a basis of input image data, comprises:

performing a background adjustment on a basis of a plurality of background adjustment γ curves;

setting one background adjustment γ curve from the plurality of background adjustment γ curves;

processing the input image data with the set background adjustment γ curve; and performing duplex recording control to the two faces of the recording paper on a basis of output image data to which the background adjustment is performed.

According to the third aspect of the invention, the background adjustment of an image can be performed sensitively by using the background adjustment γ curve. Furthermore, the show-through part of an image can be removed by using the background adjustment γ curve without using any filters for removing the show-through part. In addition, because the background adjustment can be performed in detail, the case where the approximate lightness of a background part is uniformly smoothed can be avoided.

According to a fourth aspect of the present invention, an image processing program to be executed by a computer for performing an image processing capable of duplex recording on two faces of recording paper on a basis of input image data, the program comprises:

performing a background adjustment on a basis of a plurality of background adjustment γ curves;

setting one background adjustment γ curve from the plurality of background adjustment γ curves;

processing the input image data with the set background adjustment γ curve; and performing duplex recording control to the two faces of the recording paper on a basis of output image data to which the background adjustment is performed.

According to the fourth aspect of the invention, the background adjustment of an image can be performed sensitively by using the background adjustment γ curve. Furthermore, the show-through part of an image can be removed by using the background adjustment γ curve without using any filters for removing the show-through part. In addition, because the background adjustment can be performed in detail, the case where the approximate lightness of a background part is uniformly smoothed can be avoided.

Preferably, the processing of the input image data is performing the background adjustment by adjusting a density value of the input image data on a basis of:

a background adjustment γ curve which increases monotonically from a low density value to a high density value in a range where the density value of the input image data is equal to or less than 0.63 in order that a gradient of the background adjustment γ curve changes from being equal to or less than 1 to being more than 1, or a background adjustment γ curve which increases monotonically from a low density value to a high density value in a range where the density value of the input image data is equal to or more than 0.24 and equal to or less than 0.63 in order that a gradient of the background adjustment γ curve changes from being equal to or less than 1 to being more than 1.

According to the present invention, the background adjustment of an image can be performed sensitively by selecting a suitable background adjustment γ curve automatically. Furthermore, the show-through part of an image can be removed by using the background adjustment γ curve without using any filters for removing the show-through part. In addition, because the background adjustment can be performed in detail, the case where the approximate lightness of a background part is uniformly smoothed can be avoided.

According to the present invention, the processing of the input image data is:

obtaining a histogram on a basis of the input image data, searching a highlight point in a range where a density value of the input image data is equal to or less than 0.63, and selecting and setting a background adjustment γ curve capable of smoothing highlight reproduction between predetermined values on a basis of a width value between two feet of a highlight peak at the highlight point and capable of preventing show-through when the width value is equal to or more than 30, selecting and setting a background adjustment γ curve capable of highlight reproduction while preventing background fogging on a basis of a peak value of the highlight peak when the width value is less than 30 and the density value of the peak value is equal to or more than 0.11, or selecting and setting a background adjustment γ curve to which no adjustment is performed when the width value is less than 30 and the peak value of the highlight.

According to the present invention, the background adjustment of an image can be performed sensitively by selecting a suitable background adjustment γ curve automatically by the above program. Furthermore, the show-through part of an image can be removed by using the background adjustment γ curve without using any filters for removing the show-through part. In addition, because the background adjustment can be performed in detail, the case where the approximate lightness of a background part is uniformly smoothed can be avoided.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

PREFERRED EMBODIMENTS OF THE INVENTION

Figure 1:
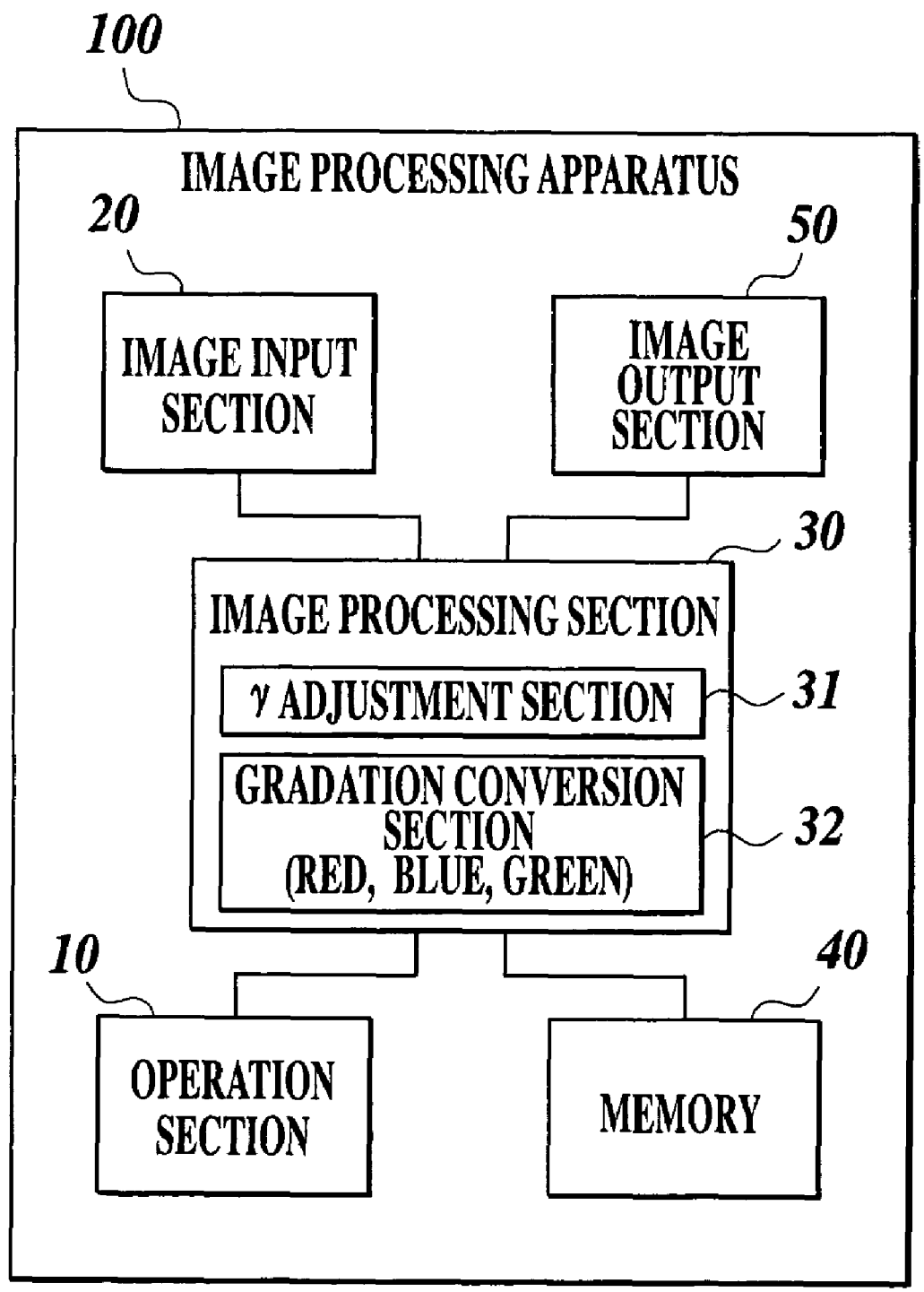
FIG. 1 is a block diagram showing an internal configuration of an image processing apparatus to which a first embodiment of the present invention is applied.

Hereinafter, the embodiment of an image processing apparatus of the present invention will be described referring to the drawings. Although an image processing apparatus, an image processing method and an image processing program will be described citing the embodiment of the image processing apparatus; they are not limited to the present embodiment.

First Embodiment

An image processing apparatus 100 to which a first embodiment of the present invention is applied will be described referring to FIG. 1 to FIG. 3.

The image processing apparatus 100 performs a gradation adjustment for adjusting input gradation obtained from an input image to output gradation. Then the image processing apparatus 100 prints out or displays an output image having the output gradation. Hereupon, any gradation is acceptable, as long as it can represent the lights/darks of an image such as luminance, density and approximate lightness. Gradation capable of mutual numerical inversion is preferable.

First, the configuration of the image processing apparatus 100 will be described referring to FIG. 1.

As shown FIG. 1, the image processing apparatus 100 comprises an operation section 10, an image input section 20, an image processing section 30, a memory 40 as a storage section, an image output section 50 and the like.

The operation section 10 comprises various input keys for performing various inputs of instructions. The image input section 20 comprises an image reading apparatus (not shown) such as a scanner for reading an image from an original, and sends the data of the read image to the image processing section 30.

The image processing section 30 can operate according to the various instructions input through the operation section 10. Further, the image processing section 30 executes various programs stored in the memory 40 to control the image processing apparatus 100 totally.

Figure 2:
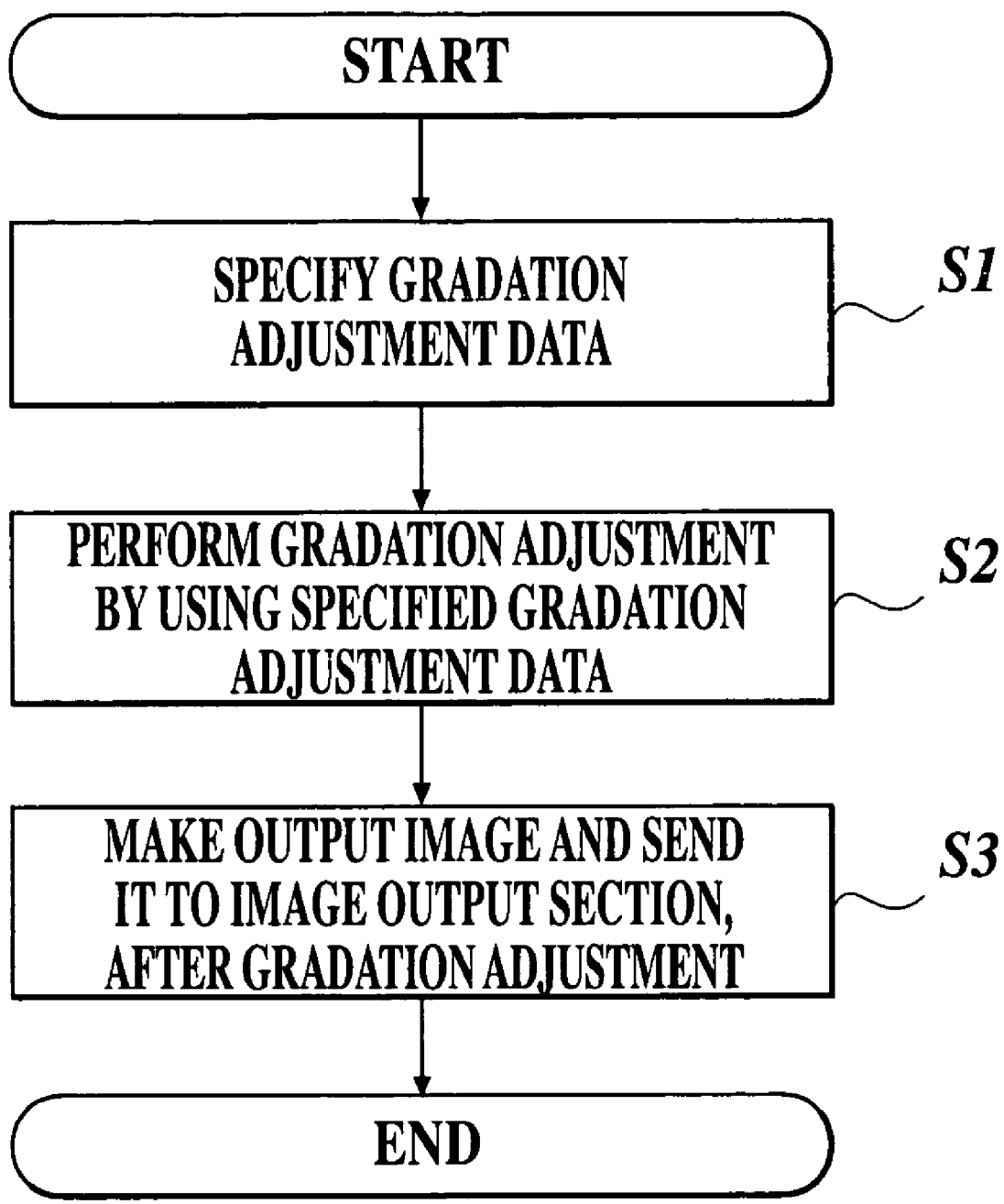
FIG. 2 is a flowchart for explaining an image processing by an image processing apparatus to which a first embodiment of the present invention is applied.

In particular, the image processing section 30 performs an image processing shown in a flowchart of FIG. 2 by using a γ adjustment section 31 and a gradation adjustment section 32. This image processing may be performed by an image processing program stored in the memory 40, or may be also performed by a hardware.

In addition to storing the various programs executed by the image processing section 30, the memory 40 also stores various data required when the programs are executed. In particular, the memory 40 stores an image processing program for executing the image processing shown in the flowchart of FIG. 2 and gradation data corresponding to a density adjustment, a contrast adjustment, a background adjustment, a red color adjustment, a blue color adjustment and a green color adjustment, respectively for maximum representation, standard representation and minimum representation (that is, gradation data of a total of 18 patterns).

Hereupon, the gradation adjustment data for maximum representation means gradation adjustment data for obtaining output gradation each of adjustment contents of which (for example, density) is most enhanced with respect to input gradation. The gradation adjustment data for standard representation means gradation data for obtaining output gradation each of adjustment contents of which is conventionally standard. The gradation adjustment data for minimum representation means gradation data for obtaining output gradation each of adjustment contents of which is minimized with respect to input gradation. Although each of the above gradation data is set in advance arbitrarily, each of them can be changed as needed. FIG. 3 shows examples of γ curves D1, D2 and D3 respectively corresponding to gradation adjustment data for maximum representation, gradation adjustment data for standard representation and gradation adjustment data for minimum representation.

The image output section 50 comprises a printer or a LCD (Liquid Crystal Display) (both are not shown), for printing out or displaying an image to which an image processing (a gradation adjustment) is performed by the image processing section 30.

Next, the image processing of the present invention will be described referring to FIG. 2.

First, the γ adjustment section 31 selects or calculates gradation adjustment data according to level specification which is input through the operation section 10, with respect to the adjustment specified through the operation section 10 among the density adjustment, the contrast adjustment, the background adjustment, the red color adjustment, the blue color adjustment and the green color adjustment. For example, 9 steps form "−4" to "+4" are applied as the steps for the level specification.

Figure 3:
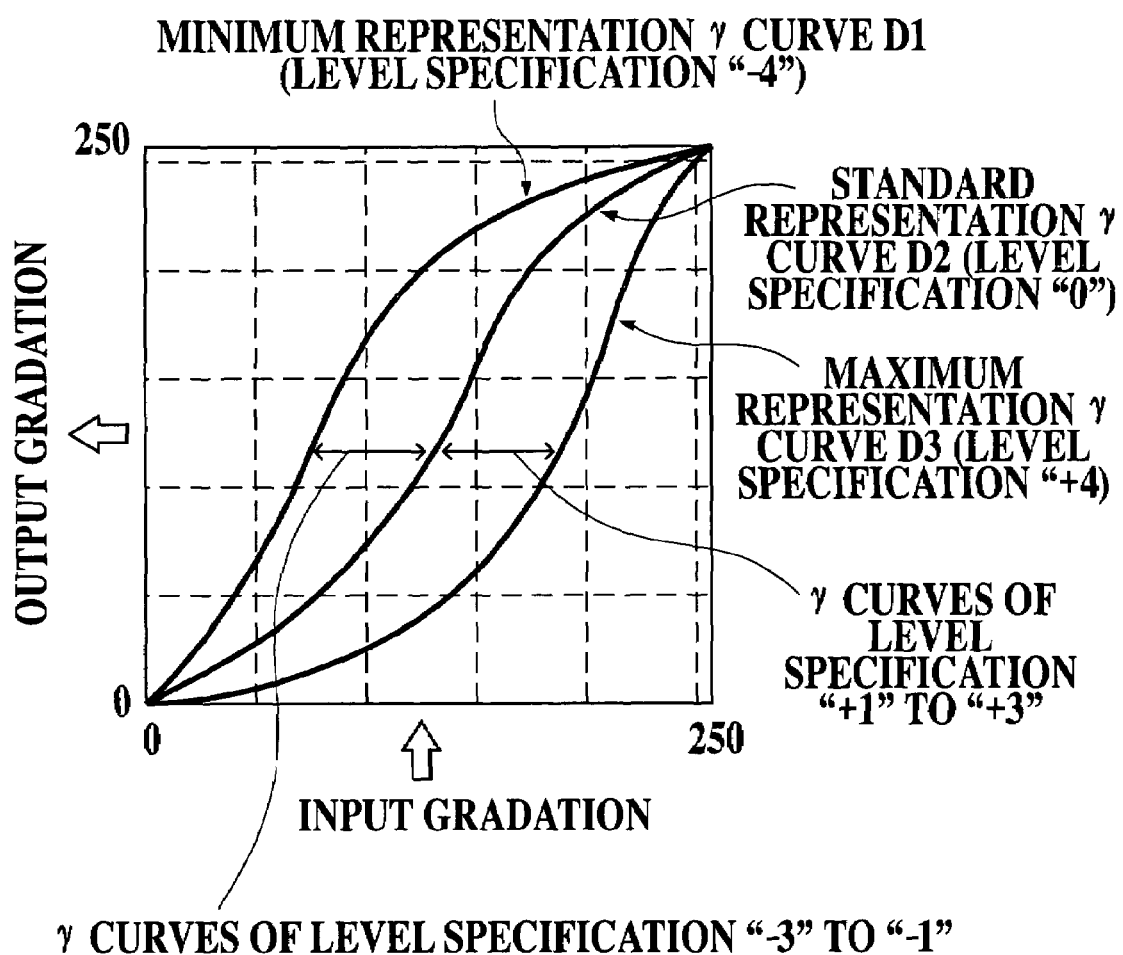
FIG. 3 is a view showing examples of γ curves used by an image processing apparatus to which a first embodiment of the present invention is applied.

As shown in FIG. 3, for example, when the level specification is "−4", the gradation adjustment data for maximum representation is selected, when the level specification is "+4", the gradation adjustment data for minimum representation is selected, and when the level specification is "0", the gradation adjustment data for standard representation is selected.

When the level specification is in the range of from "−3" to "+3", gradation adjustment data corresponding to the value G3 calculated based on the following formula 3 is calculated.

$$G3(n)=(1.0-R(k))\times G1(n)+R(k)\times G2(n) \quad \text{[Formula 3]}$$

Hereupon, n (for example, 8 bits data from 0 to 255) represents input gradation, R(k) represents the value corresponding to the level specification k (k is the integer from −3 to 3; when the value of k is 0, the value of R(0) is 0), G1 represents a gradation adjustment function corresponding to the gradation adjustment data for standard representation, G2 represents a gradation adjustment function corresponding to the gradation adjustment data for maximum (or minimum) representation, and G3 represents a combined gradation adjustment function corresponding to combined gradation adjustment data.

After that, on the basis of a plurality of gradation adjustment data selected or calculated on the basis of the above level specification, the γ adjustment section 31 makes the combined gradation adjustment data corresponding to a combined γ curve formed by combining each of γ curves corresponding to the plurality of gradation adjustment data. The combined gradation adjustment data made in such way is reflected by each of combined adjustment contents (including maximum representation, standard representation, and minimum representation) among each of adjustment contents of the density adjustment, the contrast adjustment, the background adjustment, the red color adjustment, the blue color adjustment, and the green color adjustment.

For example, a combined gradation adjustment function corresponding to a combined γ curve formed by combining each of two γ curves corresponding to two gradation adjustment data on the basis of the two gradation adjustment data is represented according to the following formula 4.

$$G3(n)=G2(G1(n))$$ [Formula 4]

Hereupon, n (for example, 8 bits data from 0 to 255) represents input gradation, Each of G1 and G2 represents a gradation adjustment function corresponding to each of gradation adjustment data to be combined, and G3 represents a combined gradation adjustment function corresponding to combined gradation adjustment data.

In accordance with the formula 3, output gradation which is obtained after the gradation adjustment of the gradation, which is obtained after the gradation adjustment of input gradation n by using the gradation adjustment function G1, by using the gradation adjustment function G2 is the same as output gradation obtained after the gradation adjustment of the input gradation n by using the combined gradation adjustment function G3.

As above, the gradation adjustment data to be used at the gradation adjustment is specified (Step S1).

Incidentally, when the above-described selected or calculated gradation adjustment data is only one, the combining of the gradation adjustment data is not performed.

Further, the γ adjustment section 31 judges whether or not there is a point where the magnitude relation between output gradation m2 and n2 of the combined gradation adjustment data respectively corresponding to two adjacent input gradation m1 and n1 of the combined gradation adjustment data (n1=m1+1, m1<n1) is reversed from the magnitude relation between the input gradation m1 and m2 (that is, the point where the magnitude relation is m2>n2), with respect to whole region of the input gradation. When there is a point where the magnitude relation is reversed, the output gradation corresponding to the input gradation m1 is defined as n2 and the output gradation corresponding to the input gradation n1 is defined as m2, and the reversing of the magnitude relation is resolved. Next, the gradation adjustment section 32 performs each of the red color gradation adjustment, the blue color gradation adjustment and the green color gradation adjustment (Step S2) by using the gradation adjustment data (including combined gradation adjustment data) specified in Step S1 with respect to the input image input through the image input section 20. That is, the combined gradation adjustment data are applied to all of the three gradation adjustments.

Incidentally, when combined gradation adjustment data is made on the basis of gradation adjustment data corresponding to any adjustment of the red color adjustment, the blue color adjustment and the green color adjustment, the combined gradation adjustment data is applied only to the gradation adjustment corresponding to the color.

For example, combined gradation adjustment data made on the basis of the gradation adjustment data corresponding to the contrast adjustment and the gradation adjustment data corresponding to the red color gradation adjustment is applied only to the red color gradation adjustment.

An output image is made on the basis of the output gradation, to which the gradation adjustment is performed by the gradation adjustment section 32 in Step S2. Then, the output image is sent to the image output section 50 (Step S3).

As described above, the image processing apparatus 100 makes combined gradation adjustment data corresponding to a combined γ curve formed by combining each of γ curves corresponding to a plurality of gradation adjustment data, on the basis of the plurality of gradation adjustment data corresponding to γ curves with respect to each of adjustment contents of the density adjustment, the contrast adjustment, background adjustment, red color adjustment, blue color adjustment and the green color adjustment.

Therefore, the memory 40 previously stores only each of gradation adjustment data respectively corresponding to the density adjustment, the contrast adjustment, the background adjustment, the red color adjustment, the blue color adjustment and the green color adjustment (each of the adjustments includes the three kinds of adjustment of maximum representation, standard representation and minimum representation). Then gradation adjustment data corresponding to various combined adjustment formed by combining the plurality of above adjustments can be made in each case, by using only the gradation adjustment data stored in the memory 40. Consequently, it is not necessary that the memory 40 previously stores a great amount of combined gradation adjustment data corresponding to the combined adjustment.

On the other hand, because the memory capacity of the memory 40 is made to be smaller, it is not necessary to limit combination contents (combination patterns deciding adjustments to be combined). Consequently, various gradation adjustments can be realized easily. Furthermore, a plurality of combined gradation adjustment data are made on the basis of at least three kinds of gradation conversion data, even in the same gradation adjustment. Consequently, gradation adjustments of a lot of variations can be performed, and the number of gradation conversion data to be stored is reduced.

That is, the image processing apparatus and the image processing program capable of performing various gradation adjustments can be provided without requiring a great amount of memory capacity in the memory 40.

Incidentally, the description of the present embodiment provides an example of the image processing apparatus and the image processing program related to the present invention, and the present invention is not limited to the present embodiment. The detailed configuration and the detailed operation of the image processing apparatus 100 of the present embodiment can be changed without departing the essence of the present invention.

For example, the gradation conversion section 32 performs the red color gradation adjustment, the blue color gradation adjustment and the green color gradation adjustment and the image processing apparatus 100 performs color image processing. However, not limited to the color image processing, the image processing apparatus 100 can also perform monocolor (including black and white) image processing. Furthermore, the image processing apparatus 100 may select the color image processing or the monocolor processing alternatively.

From above, a storage section previously stores only each of gradation adjustment data for performing a plurality kinds of the gradation adjustments, for example, such as the density adjustment, the contrast adjustment, the background adjustment, the red color adjustment, the blue color adjustment and the green color adjustment (each of the adjustments includes, for example, the three kinds of adjustment of maximum representation, standard representation and minimum representation). Then gradation adjustment data corresponding to various combined adjustment formed by combining the plurality of above adjustments can be made in each case, by using only the gradation adjustment data stored in the storage section. Consequently, it is not necessary that the storage section previously stores a great amount of combined gradation adjustment data corresponding to the combined adjustment.

On the other hand, because the memory capacity of the storage section is made to be smaller, it is not necessary to limit combination contents (combination patterns deciding adjustments to be combined). Consequently, various gradation adjustments can be realized easily. Furthermore, a plurality of combined gradation adjustment data are made on the basis of at least three kinds of gradation conversion data, even in the same gradation adjustment. Consequently, gradation adjustments of a lot of variations can be performed, and the number of gradation conversion data to be stored is reduced.

That is, the image processing apparatus and the image processing program capable of performing various gradation adjustments can be provided without requiring a great amount of memory capacity in the storage section.

Second Embodiment

An image processing apparatus 101 of a second embodiment of the present invention will be described referring to FIG. 4 to FIG. 6. In the second embodiment, instead of the γ adjustment section and the gradation conversion section in the image processing section and the memory 40 for storing the programs of the first embodiment, a background adjustment section is provided and the memory is changed.

First, the configuration of the image processing apparatus 101 will be described referring to FIG. 4.

Figure 4:
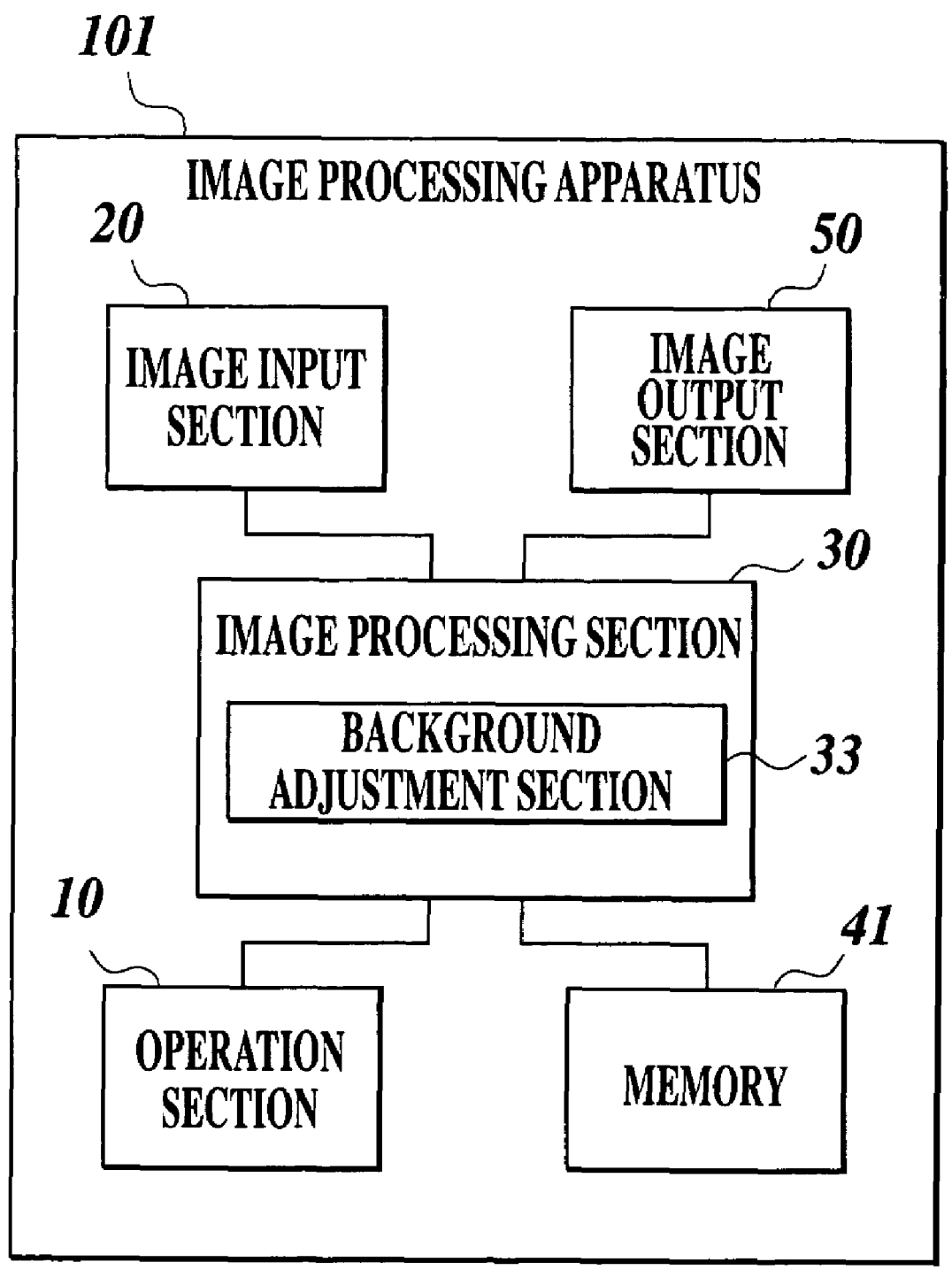
FIG. 4 is a block diagram for explaining an image processing, which uses a background adjustment γ curve, by an image processing apparatus to which a second embodiment of the present invention is applied.
Figure 5:
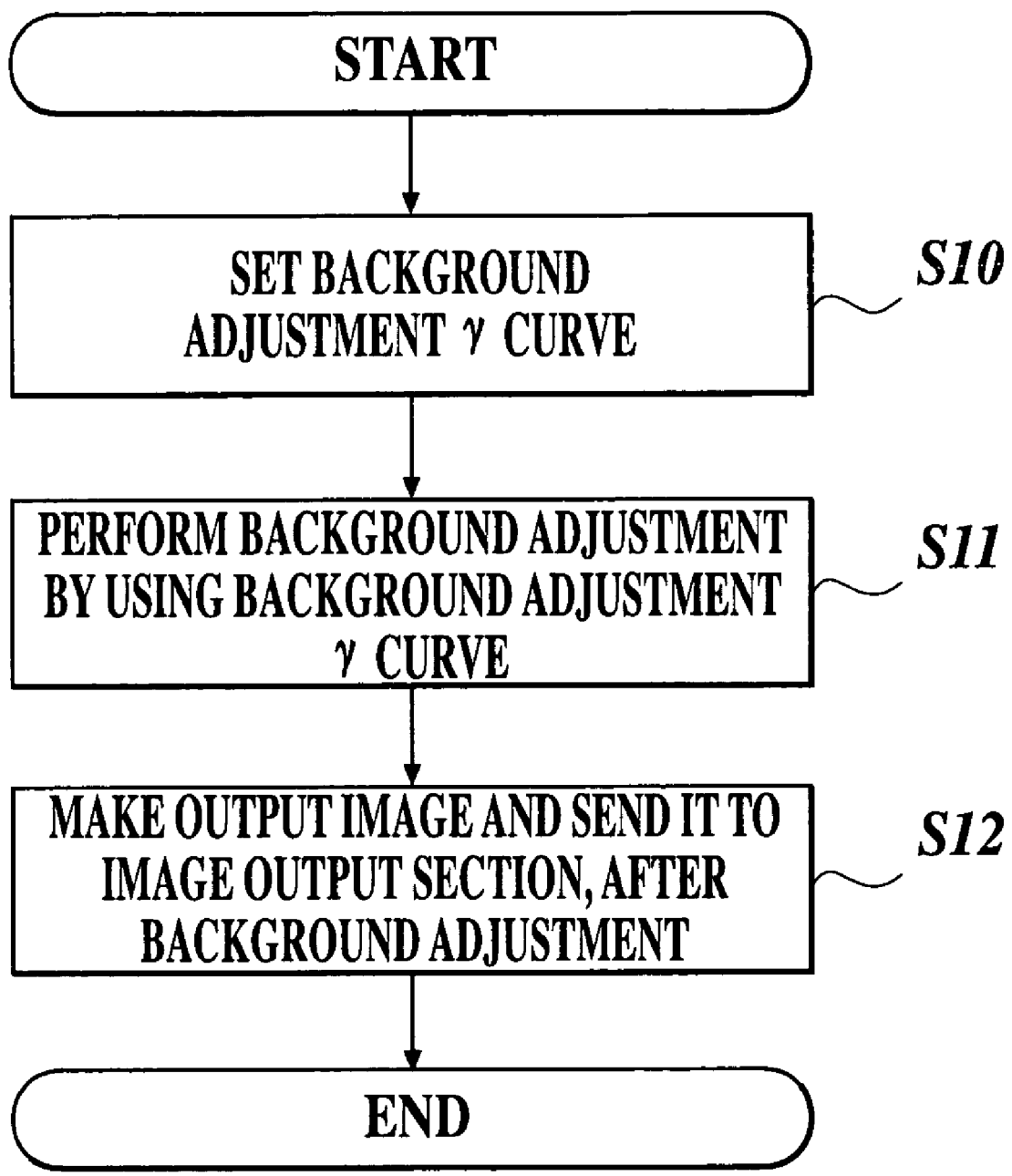
FIG. 5 is a flowchart for explaining an image processing by an image processing apparatus to which a second embodiment of the present invention is applied.

As shown in FIG. 4, the image processing apparatus 101 comprises an operation section 10, an image input section 20, an image processing section 30, a memory 41 as a storage section, an image output section 50 and the like.

The operation section 10 comprises various input keys for performing various inputs of instructions. The image input section 20 comprises an image reading apparatus (not shown) such as a scanner, reads an image from an original, and sends the data of the read image to the image processing section 30.

The image processing section 30 can operate according to the various instructions input through the operation section 10. Further, the image processing section 30 executes various programs stored in the memory 41 to control the image processing apparatus 101 totally.

In particular, the image processing section 30 comprises a background adjustment section 33, and controls the background adjustment section 33 on the basis of an image processing program shown in a flowchart of FIG. 2. Hereupon, the image processing 30 obtains the luminance of input image data from the input image sent from the image input section 20, and calculates the approximate lightness of the input image data on the basis of the obtained luminance. Further, the image processing section 30 comprises a function for setting a background adjustment γ curve used by the background adjustment section 33.

The background adjustment section 33 performs the background adjustment so as to adjust the approximate lightness of the input image data calculated by the image processing section 30 to the approximate lightness of the output image data on the basis of the background adjustment γ curve.

Incidentally, the background adjustment performed by the background adjustment section 33 may be performed by a hardware, or may be also performed by an image processing program executed by the image processing section 30.

In addition to storing the various programs executed by the image processing section 30, the memory 41 also stores various data required when the programs are executed. In particular, the memory 41 stores an image processing program shown in the flowchart of FIG. 2.

The memory 41 previously stores several kinds of background adjustment γ curves (hereinafter, the explanation will be given providing two kinds of the background adjustment γ curves A1 and A2 shown in FIG. 6).

The image output section 50 comprises a printer or a LCD (Liquid Crystal Display) (both are not shown), for printing out or displaying an image to which an image processing (a gradation adjustment) is performed by the image processing section 30.

Next, An operation of the image processing apparatus 101 will be described referring to FIG. 5 and FIG. 6. An image processing flow described blow is performed by executing the image processing program stored in the memory 41 by the image processing section 30.

First, in accordance with the level specification (for example, 9 steps from "−4" to "+4") input through the operation section 10 by the user's selection, the background adjustment γ curve is set (Step S10). Hereupon, for example, when the level specification is "−4", a background adjustment γ curve A1 is set, and when the level specification is "+4", a background adjustment γ curve A2 is set. When the level specification is set in the range of from "−3" to "+3", the other background adjustment γ curves are respectively set according to the input level specification on the basis of the background adjustment γ curves A1 and A2.

After that, the luminance of input image data input through the image input section 20 is obtained from the input image data, and the approximate lightness of the input image data is calculated on the basis of the obtained luminance. Then the background adjustment is performed by using the background adjustment section 33, on the basis of the background adjustment γ curve set in Step S10, so as to adjust the approximate lightness of the input image data to the approximate lightness of the output image data (Step S11).

Hereupon, the two kinds of the background adjustment γ curves A1 and A2 previously stored in the memory 41 will be described referring to FIG. 6.

Figure 6:
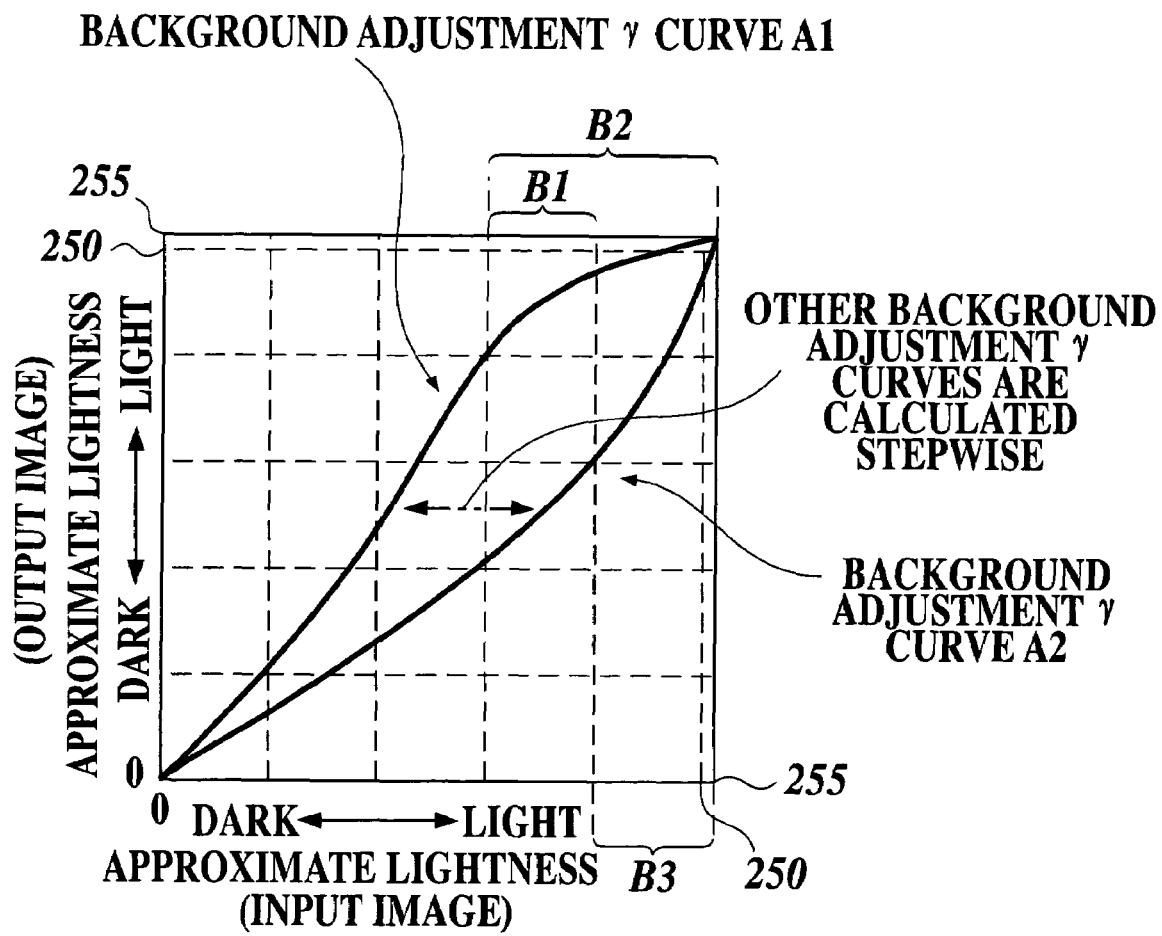
FIG. 6 is a view showing variations of a background adjustment γ curve used by an image processing apparatus to which a second embodiment of the present invention is applied.

The background adjustment γ curve A1 is a continuous curve, which increases monotonically with an approximately constant gradient (in the case of FIG. 6, the gradient is more than 1) in the range where the approximate lightness of the input image is 0 (at this point, the approximate lightness of the output image is 0) to 150 (at this point, the approximate lightness of the output image is 200), and increases monotonically with a gradient equal to or less than 1 in the range as shown with the note B2 in FIG. 6, where the approximate lightness of the input image is equal to or more than 150. By using the background adjustment γ curve A1, in addition to enough removing of the show-through part, the background lightening can be realized well.

The background adjustment γ curve A2 is a continuous curve, which increases monotonically with an approximately constant gradient (in the case of FIG. 6, the gradient is less than 1) in the range where the approximate lightness of the input image is 0 (at this point, the approximate lightness of the output image is 0) to 200 (at this point, the approximate lightness of the output image is 150), and increases monotonically with a gradient equal to or more than 1 in the range as shown with the note B3 in FIG. 6, where the approximate lightness of the input image is equal to or more than 200. By using the background adjustment γ curve A2, in addition to enough highlight enhancing, background fogging can be avoided well.

Each of the other background adjustment γ curves between the background adjustment γ curve A1 and the background adjustment γ curve A2 is set in each case, on the basis of the background adjustment γ curves A1 and A2, according to the level specification input through the operation section 10.

That is, when the density value of input image data is adjusted on the basis of a background adjustment γ curve, the memory 41 stores the image processing program for realize the function for performing the background adjustment so as to adjust the density value of the input image data on the basis of a background adjustment γ curve which increases monotonically from a low density value to a high density value in the range where the density value of the input data is equal to or less than 0.63 in order that a gradient of the background adjustment γ curve changes from being equal to or less than 1 to being more than 1, or a background adjustment γ curve which increases monotonically from a low density value to a high density value in a range where a density value of the input image data is equal to or more than 0.24 and equal to or less than 0.63 in order that a gradient of the background adjustment γ curve changes from being equal to or less than 1 to being more than 1.

Incidentally, the detailed shapes of the background adjustment γ curves A1 and A2 are not limited to those shown in FIG. 6. That is, the detailed shape of the background adjustment γ curve A1 is not limited to that of in FIG. 6, as long as the show-through part can be removed, and in addition, the lightening of the background can be realized well. Further, the detailed shape of the background adjustment γ curve A2 is not limited to that of FIG. 6, as long as the highlight enhancing is performed well, and in addition, the background fogging can be avoided well.

Again, the explanation will be given referring to FIG. 5.

After Step S11, the output image to which the background adjustment has been performed by the background adjustment section 33 is made, and sent to the image output section 50 (Step S12).

As described above, the image processing apparatus 101 to which the present invention is applied performs the background adjustment of an image on the basis of the background adjustment γ curve A1 and the background adjustment γ curve A2: hereupon, the background adjustment γ curve A1 passes the point where the approximate lightness of an input image data is 150 and the approximate lightness of an output image data is 200, increases monotonically with the gradient more than 1 in the area where the approximate lightness of the input image data is 0 to 150, and increases monotonically with the gradient equal to or less than 1 in the area where the approximate lightness of the input image data is equal to or more than 150 (the area shown by the note B2 in FIG. 6); and the background adjustment γ curve A2 passes the point where the approximate lightness of the input image data is 200 and the approximate lightness of the output image data is 150, increases monotonically with the gradient less than 1 in the area where the approximate lightness of the input image data is 0 to 200, and increases monotonically with the gradient equal to or more than 1 in the area where the approximate lightness of the input image data is equal to or more than 200 (the area shown by the note B3 in FIG. 6).

Furthermore, the image processing apparatus 101 sets background adjustment γ curves other than the background adjustment γ curves A1 and A2 according to the level specification input through the operation section 10, on the basis of the background adjustment γ curves A1 and A2.

Incidentally, each value of the above-described approximate lightness (150 and 200), that is, the each shape of the background adjustment γ curves A1 and A2 shown in FIG. 6 is an example. Therefore, as long as the same effect as that obtained by using the background adjustment γ curves A1 and A2 described above can be obtained, the value of the approximate lightness is not limited to the above.

Therefore, even if the γ adjustment processing section and the gradation adjustment section are not used, the show-through part can be removed well, and in addition, the background lightening can be realized well, by the background adjustment based on the background adjustment γ curve A1. Further, the highlight enhancing can be performed well, and in addition, the background fogging can be avoided well, by the background adjustment based on the background adjustment γ curve A2. Further, background adjustment γ curves other than the background adjustment γ curves A1 and A2 can be set, and accordingly, more detailed background adjustments preferred by a user can be realized.

Incidentally, the description of the present embodiment provides an example of the image processing apparatus and the image processing program related to the present invention, and the present invention is not limited to the present embodiment. The detailed configuration and the detailed operation of the image processing apparatus 101 of the present embodiment can be changed without departing the essence of the present invention.

For example, in the present embodiment, a lights/darks representation value for representing the lights/darks of an image is described by using the approximate lightness. However, not limited to the approximate lightness, various lights/darks representation values such as density, lightness or luminance capable of alternative numerical inversion by using the above formula 1, formula 2 or the like may be used.

From above, the background adjustment of an image can be performed sensitively by using the background adjustment γ curve. Furthermore, because the show-through part of an image is removed by using the background adjustment γ curve without using any filters for removing the show-through part, the complicating of the processing flow can be avoided. In addition, because the background adjustment can be performed in detail, the case where the approximate lightness of a background part is uniformly smoothed can be avoided. Further, the reproducibility to the input image data is improved, and in addition, complicated background adjustment such as enhancing the background part while avoiding the background fogging can be performed easily.

That is, the background adjustment can be performed sensitively with respect to the background part of which image lightness is relatively lighter, without complicating the processing flow.

Third Embodiment

An image processing apparatus 102 of a third embodiment of the present invention will be described referring to FIG. 7 to FIG. 9. The configuration, the operation and the effect differing from those of the second embodiment will be described. Incidentally, the configuration of the image processing apparatus 102 of the third embodiment of the present invention is the same as that of the image processing apparatus 101 of the second embodiment added a memory 42 as a storage section for storing various programs for automatic selection of a background adjustment γ curve, which is executed by the image processing section 30.

First, the configuration of the image processing apparatus 102 will be described referring to FIG. 7.

Figure 7:
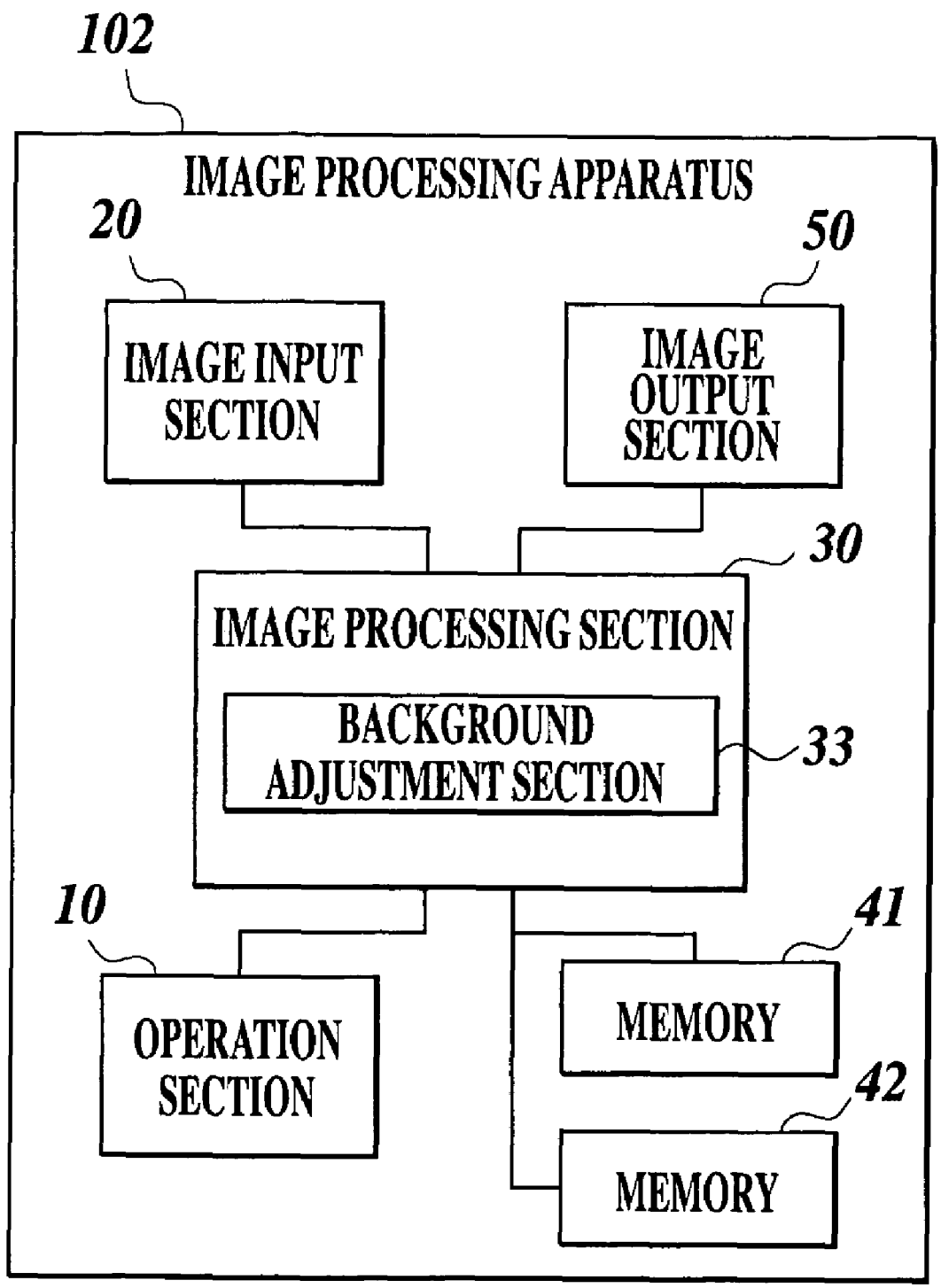
FIG. 7 is a block diagram showing an internal configuration of an image processing apparatus to which a third embodiment is applied.

As shown in FIG. 7, the image processing apparatus 102 comprises an operation section 10, an image input section 20, an image processing section 30, a memory 41, a memory 42, an image output section 50 and the like.

The image processing section 30 can operate according to the various instructions input through the operation section 10. Further, the image processing section 30 executes various programs stored in the memories 41 and 42 to control the image processing apparatus 102 totally.

The memory 42 stores the program for the automatic selection of the background adjustment γ curve, which is executed by the image processing section 30, and in addition, stores various data required for executing the program. In particular, the memory 42 stores an image processing program shown in a flowchart of FIG. 8.

Next, the operation of the image processing apparatus 102 will be described. The processing flow described below is performed by executing the image processing program stored in the memories 41 and 42.

Figure 8:
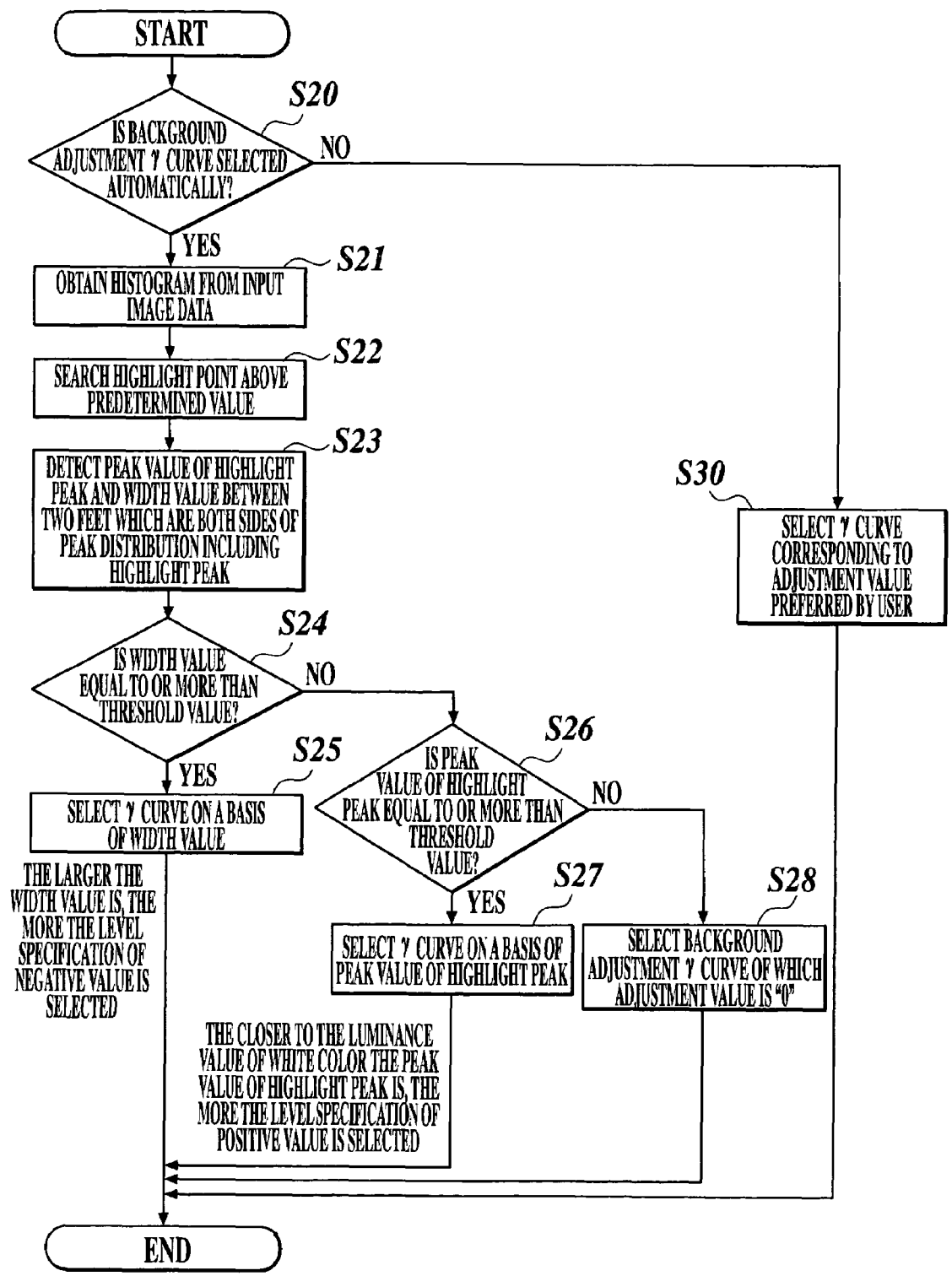
FIG. 8 is a flowchart for explaining the selection of a background adjustment γ curve by an automatic background adjustment section of an image processing apparatus to which a third embodiment of the present invention is applied.

As shown in FIG. 8, when level specification is not input through the operation section 10, the image processing section 30 selects the background adjustment γ curve automatically on the basis of the image processing program stored in the memory 42 (Step S20). The level specification (for example, 9 steps from "−4" to "+4") is performed by the automatic selection of the background adjustment.

Hereinafter, the automatic selection of the background adjustment γ curve will be described (Step S21 to Step S28).

The image processing section 30 obtains a histogram from an input image data (Step S21), and searches a highlight point above predetermined value (Step S22). For example, the highlight point above predetermined value is the highlight point existing in the range where the density of the input image data is less than 0.63.

Figure 9:
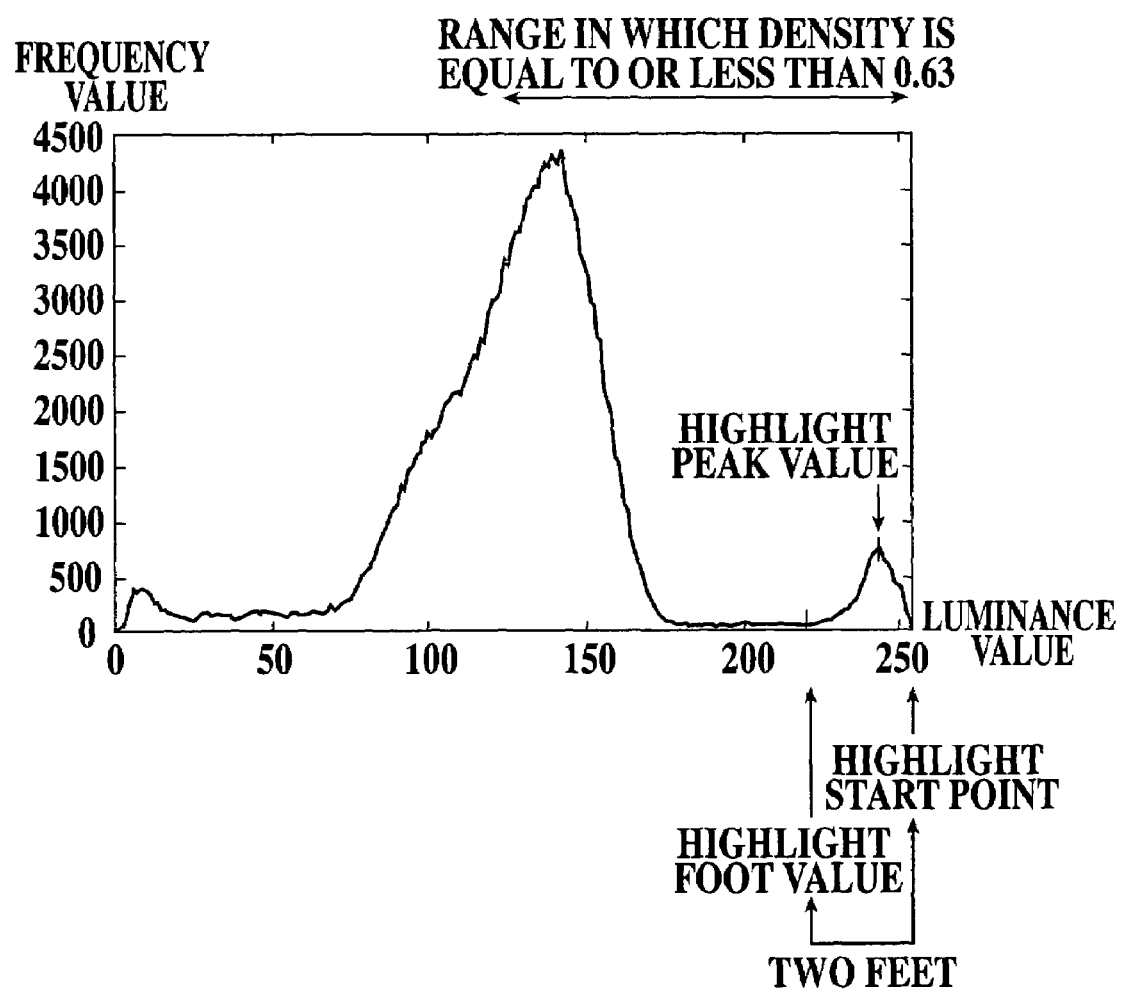
FIG. 9 is a view showing an example of a histogram obtained by an image processing apparatus to which a third embodiment of the present invention.

An example of the obtained histogram is shown in FIG. 9. However, the histogram obtained from the input image data is not limited to that in FIG. 9.

The value of the width between two feet (hereinafter, referred to as the width value), that is, the width from a highlight start point to a highlight foot value, and a peak value are detected on the basis of a highlight peak at the searched highlight point (hereinafter, referred to as the searched highlight peak) (Step S23). The background adjustment γ curve is set on the basis of comparisons between the width value of the searched highlight peak and the threshold value of the width value of a highlight peak previously stored in the memory 41 (hereinafter, referred to as the standard highlight peak) and between the peak value of the searched highlight peak and the threshold value of the peak value of the standard highlight peak. For example, the threshold value of the width value of the standard highlight peak is 30, and the threshold value of the peak value of the standard highlight peak is 0.11.

When the width value of the searched highlight peak is equal to or more than the threshold value of the width value of the standard highlight peak (Step S24; Yes), the larger the width value of the searched highlight peak is, the more the level specification of a negative value ("−4" to "0") is selected (Step S25).

When the width value of the searched highlight peak is less than the threshold value of the width value of the standard highlight peak (Step S24; No) and the peak value of the searched highlight peak is equal to or more than the threshold value of the peak value of the standard highlight peak (Step S26; Yes), the closer to the luminance value of white color the peak value of the searched highlight peak is, the more the level specification of a positive value ("0" to "+4") is selected (Step S27).

Figure 10:
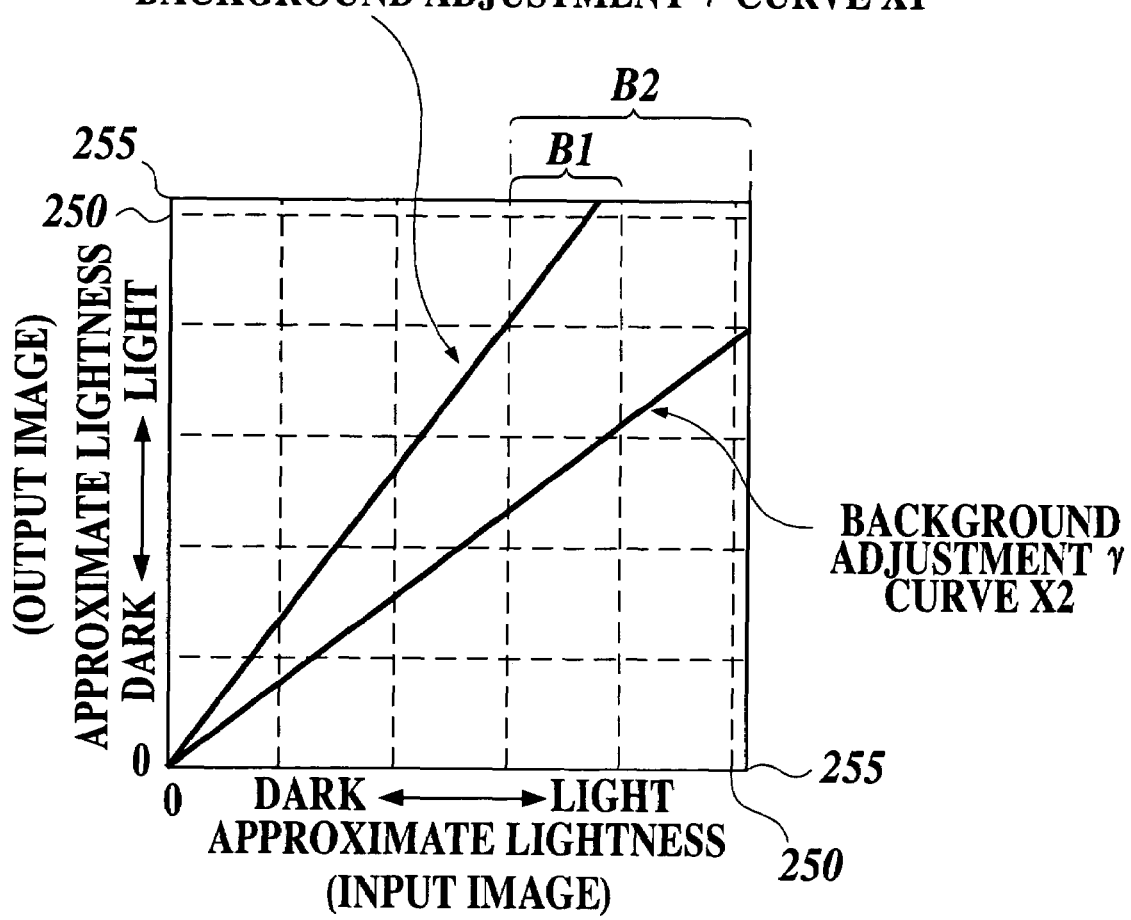
FIG. 10 is a view showing variations of a conventional background adjustment γ curve.

When the width value of the searched highlight peak is less than the threshold value of the width value of the standard highlight peak (Step S24; No) and the peak value of the searched highlight peak is less than the threshold vale of the peak value of the standard highlight peak (Step S26; No), any level specification are selected and a background adjustment γ curve of which adjustment value is "0" is selected (Step S28). When the background adjustment γ curve of which adjustment value is "0" is selected, a conventional background adjustment γ curve X1 or a conventional background adjustment γ curve X2, as shown in FIG. 10, is selected.

The background adjustment γ curve is set on the basis of the above-described selected level specification (Step S10).

The setting of the background adjustment γ curves A1 and A2 and the other background adjustment γ curves or the like after Step S10 are the same as those of the second embodiment, are performed by executing the image processing program stored in the memory 41 by the image processing section 30, and controlling the background adjustment section 33 by the image processing section 30 on the basis of the image processing program.

For example, when the level specification is "−4", a background adjustment γ curve A1 is set, and when the level specification is "+4", a background adjustment γ curve A2 is set. When the level specification is set in the range of from "−3" to "+3", the other background adjustment γ curves are respectively set according to the input level specification on the basis of the background adjustment γ curves A1 and A2.

After that, the luminance of input image data input through the image input section 20 is obtained from the input image data, and the approximate lightness of the input image data is calculated on the basis of the obtained luminance. Then the background adjustment is performed by using the background adjustment section 33, on the basis of the background adjustment γ curve set in Step S10, so as to adjust the approximate lightness of the input image data to the approximate lightness of the output image data (Step S11).

Each of the other background adjustment γ curves between the background adjustment γ curve A1 and the background adjustment γ curve A2 is set in each case, on the basis of the background adjustment γ curves A1 and A2, according to the level specification input through the operation section 10 (Step S11). After the background adjustment, the output image is made and sent to the image output section 50 (Step S12).

Therefore, the image processing apparatus 102 can select the background adjustment γ curve automatically, which is suitable for the output image data on the basis of the input image data. In particular, by smoothing highlight reproduction between predetermined values by the background adjustment based on the background adjustment γ curve A1, the show-through caused by a light background can be removed well, and in addition, the background lightening can be realized we ll. Further, by enhancing highlight reproduction between predetermined values by the background adjustment based on the background adjustment γ curve A2, the highlight reproduction can be performed while preventing the background fogging.

Incidentally, as shown in FIG. 8, the background adjustment γ curve corresponding to an adjustment value preferred by a user can be selected through the operation section 10 (Step S30), without performing the automatic selection of the background adjustment (Step S20; No). In this case, as shown in FIG. 5, the image processing section 30 sets the background adjustment γ curve according to the level specification set by a user (Step S10), and performs the background adjustment by using the background adjustment γ curve (Step S11), on the basis of the image processing program stored in the memory 41. After the background adjustment, the image processing section 30 makes the output image and sends it to the image output section (Step S12).

Background adjustment γ curves other than the background adjustment γ curves A1 and A2 can be set, and accordingly, more detailed background adjustments preferred by a user can be realized.

Incidentally, the description of the present embodiment provides an example of the image processing apparatus and the image processing program related to the present invention, and the present invention is not limited to the present embodiment. The detailed configuration and the detailed operation of the image processing apparatus 102 of the present embodiment can be changed without departing the essence of the present invention.

For example, in the present invention, various lights/darks representation values such as density, lightness or luminance capable of alternative numerical inversion by using the above formula 1, formula 2 or the like may be used.

From above, the background adjustment of an image can be performed sensitively by using the background adjustment γ curve. Furthermore, because the show-through part of an image is removed by using the background adjustment γ curve without using any filters for removing the show-through part, the complicating of the processing flow can be avoided. In addition, because the background adjustment can be performed in detail, the case where the approximate lightness of a background part is uniformly smoothed can be avoided. Further, the reproducibility to the input image data is improved, and in addition, complicated background adjustment such as enhancing the background part while avoiding the background fogging can be performed easily.

That is, the background adjustment can be performed sensitively with respect to the background part of which image lightness is relatively lighter, without complicating the processing flow.

No. Tokugan 2003-197116 filed on Jul. 15, 2003, No. Tokugan 2003-200386 filed on Jul. 23, 2003 and No. Tokugan 2004-133753 filed on Apr. 28, 2004 including specification, claims, drawings and summary are incorporated herein by reference in its entirety.

What is claimed is:

1. An image processing apparatus capable of duplex recording on two faces of a recording paper based on input image data, the apparatus comprising:
   a storage section for storing a first background adjustment γ curve and a second background adjustment γ curve;
   an operation section for specifying a density level by a user;
   a setting section for calculating an object background adjustment γ curve from the first background adjustment γ curve and the second background adjustment γ curve in accordance with the density level specified by the operation section, and setting the calculated background adjustment γ curve;
   an image processing section for processing the input image data with the background adjustment γ curve set by the setting section; and
   an image output section for performing duplex recording control to the two faces of the recording paper based on output image data to which the background adjustment is performed by the image processing section.

2. The image processing apparatus of claim 1, wherein the first background adjustment γ curve increases monotonically from a low density value to a high density value in a range where a density value of the input image data is equal to or less than 0.63 in order that a gradient of the first background adjustment γ curve changes from being equal to or less than 1 to being more than 1.

3. The image processing apparatus of claim 1, wherein the second background adjustment γ curve increases monotonically from a low density value to a high density value in a range where a density value of the input image data is equal to or more than 0.24 and equal to or less than 0.63 in order that a gradient of the second background adjustment γ curve changes from being equal to or less than 1 to being more than 1.

4. The image processing apparatus of claim 1, wherein the setting section sets the first background adjustment γ curve as the object background adjustment γ curve when a lowest density level is specified by the operation section, and the setting section sets the second background adjustment γ curve as the object background adjustment γ curve when a highest density level is specified by the operation section.

5. The image processing apparatus of claim 1, wherein the first background adjustment γ curve has a gradient which becomes smaller in a range where lightness values are larger in comparison with a range where the lightness values are smaller.

6. An image processing method capable of duplex recording on two faces of a recording paper based on input image data, the method comprising:
   specifying a density level;
   calculating an object background adjustment γ curve from a first background adjustment γ curve and a second background adjustment γ curve in accordance with the specified density level, and setting the calculated background adjustment γ curve;
   processing the input image data with the set background adjustment γ curve; and
   performing duplex recording control to the two faces of the recording paper based on output image data to which the background adjustment is performed.

7. The image processing method of claim 6, wherein the first background adjustment γ curve increases monotonically from a low density value to a high density value in a range where a density value of the input image data is equal to or less than 0.63 in order that a gradient of the first background adjustment γ curve changes from being equal to or less than 1 to being more than 1.

8. The image processing method of claim 6, wherein the second background adjustment γ curve increases monotonically from a low density value to a high density value in a range where a density value of the input image data is equal to or more than 0.24 and equal to or less than 0.63 in order that a gradient of the second background adjustment γ curve changes from being equal to or less than 1 to being more than 1.

9. The image processing method of claim 6, wherein the first background adjustment γ curve has a gradient which becomes smaller in a range where lightness values are larger in comparison with a range where the lightness values are smaller.

10. A computer readable medium having stored thereon an image processing program which is executable by an image processing apparatus capable of duplex recording on two faces of a recording paper based on input image data, the program controlling the image processing apparatus to perform functions comprising:

specifying a density level;

calculating an object background adjustment γ curve from a first background adjustment γ curve and a second background adjustment γ curve in accordance with the specified density level, and setting the calculated background adjustment γ curve;

processing the input image data with the set background adjustment γ curve; and performing duplex recording control to the two faces of the recording paper based on output image data to which the background adjustment is performed.

* * * * *